(12) United States Patent
Allard et al.

(10) Patent No.: US 11,933,395 B2
(45) Date of Patent: Mar. 19, 2024

(54) SHIFT ENERGY MANAGEMENT THROUGH REPETITIVE GARAGE SHIFT DETECTION

(71) Applicant: FCA US LLC, Auburn Hills, MI (US)

(72) Inventors: Corey A Allard, Fenton, MI (US); Joshua J Rohrer, Rochester Hills, MI (US); Dean Baker, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/354,721

(22) Filed: Jul. 19, 2023

(65) Prior Publication Data

US 2024/0035564 A1 Feb. 1, 2024

Related U.S. Application Data

(60) Provisional application No. 63/393,558, filed on Jul. 29, 2022.

(51) Int. Cl.
| | |
|---|---|
| *F16H 61/10* | (2006.01) |
| *F16H 59/18* | (2006.01) |
| *F16H 59/40* | (2006.01) |
| *F16H 59/44* | (2006.01) |
| *F16H 59/68* | (2006.01) |
| *F16H 59/72* | (2006.01) |
| *F16H 61/00* | (2006.01) |

(52) U.S. Cl.
CPC ............ *F16H 61/10* (2013.01); *F16H 59/18* (2013.01); *F16H 59/40* (2013.01); *F16H 59/44* (2013.01); *F16H 59/68* (2013.01); *F16H 2059/725* (2013.01); *F16H 2061/0096* (2013.01)

(58) Field of Classification Search
CPC .......... F16H 59/18; F16H 59/40; F16H 59/44; F16H 59/68; F16H 2059/725; F16H 61/10; F16H 2061/0096; F16H 2312/08; F16H 2312/09
See application file for complete search history.

(56) References Cited

U.S. PATENT DOCUMENTS

| | | |
|---|---|---|
| 6,549,838 B2 | 4/2003 | O'Neil et al. |
| 7,789,797 B2 | 9/2010 | Chen et al. |
| 7,942,781 B2 | 5/2011 | Kimes |
| 8,886,423 B1 | 11/2014 | Dlugoss et al. |
| 9,086,141 B2 | 7/2015 | Neelakantan et al. |

(Continued)

*Primary Examiner* — Edwin A Young
(74) *Attorney, Agent, or Firm* — Jeremy J. Klobucar

(57) ABSTRACT

Techniques for controlling an automatic transmission of a vehicle include receiving a set of operating parameters each relating to a rock cycling maneuver of the vehicle, the rock cycling maneuver comprising a plurality of consecutive garage shifts of the transmission, determining whether the set of operating parameters satisfy a set of entry or exit criteria to/from a rock cycling mode of the transmission and enter/exit the rock cycling mode based on the determination, while not in the rock cycling mode, controlling the transmission based on a first set of calibrations for the transmission, the first set of calibrations being optimized for normal garage shifts of the transmission, and while in the rock cycling mode, controlling the transmission based on a different second set of calibrations for the transmission, the second set of calibrations being optimized for the rock cycling maneuver.

20 Claims, 3 Drawing Sheets

(56) References Cited

U.S. PATENT DOCUMENTS

| | | | |
|---|---|---|---|
| 2008/0204214 A1* | 8/2008 | Reith | B60W 50/14 340/441 |
| 2013/0096787 A1* | 4/2013 | Holub | F16H 61/12 701/54 |
| 2022/0196144 A1* | 6/2022 | Wenners | F16H 59/18 |

* cited by examiner

SHIFT ENERGY MANAGEMENT THROUGH REPETITIVE GARAGE SHIFT DETECTION

CROSS-REFERENCE TO RELATED APPLICATION(S)

The present application claims the benefit of U.S. Provisional Application No. 63/393,558, filed on Jul. 29, 2022. The disclosure of this application is incorporated herein by reference in its entirety.

FIELD

The present application generally relates to vehicle automatic transmission controls and, more particularly, to techniques for shift energy management through repetitive garage shift detection.

BACKGROUND

Many of today's vehicles are equipped with an automatic transmission that transfers drive torque from a torque generating system (e.g., an engine, an electric motor, or a combination thereof) to a driveline for vehicle propulsion. In general, the automatic transmission is transitioned into one of four primary states: park, reverse, neutral, and drive (also known as "PRND"). The term "garage shift" refers to a shift from park or neutral into either reverse or drive (forward). "Rock cycling" refers to a plurality of back-and-forth transitions between drive and reverse and through neutral (thus, a plurality of garage shifts) in an attempt to "rock" the vehicle forwards and backwards, such as out of a stuck or immovable state (in snow/ice, on rough terrain, etc.).

When the accelerator pedal is being applied during multiple consecutive garage shifts (e.g., rock cycling), there is little time for the transmission's clutches to cool down thus resulting in rising clutch temperatures that could cause a fault or malfunction of the transmission. One potential solution to this problem includes reduction of powertrain (e.g., engine) torque to allow the clutch temperatures to decrease, but this torque limiting requires additional controls and has a negative impact on customer performance. Another potential solution to this problem includes shortening the garage shifts to limit energy, but this could result in decreased or compromised shift quality for a majority of customer-performed garage shifts. Accordingly, while such conventional automatic transmission control systems do work for their intended purpose, there exists an opportunity for improvement in the relevant art.

SUMMARY

According to one example aspect of the invention, a control system for an automatic transmission of a vehicle is presented. In one exemplary implementation, the control system comprises a set of sensors configured to monitor a set of operating parameters of the vehicle, the set of operating parameters each relating to a rock cycling maneuver of the vehicle, the rock cycling maneuver comprising a plurality of consecutive garage shifts of the transmission and a controller configured to determine whether the set of operating parameters satisfy a set of entry or exit criteria to/from a rock cycling mode of the transmission and enter/exit the rock cycling mode based on the determination, while not in the rock cycling mode, control the transmission based on a first set of calibrations for the transmission, the first set of calibrations being optimized for normal garage shifts of the transmission, and while in the rock cycling mode, control the transmission based on a different second set of calibrations for the transmission, the second set of calibrations being optimized for the rock cycling maneuver.

In some implementations, the controller is configured to apply hysteresis to the determination of whether the set of operating parameters satisfy the set of exit criteria from the rock cycling mode of the transmission. In some implementations, the set of operating parameters includes (i) a shift counter of successive drive-to-reverse (D-R) or reverse-to-drive (R-D) transitions of the transmission and (ii) a temperature of a clutch of the transmission. In some implementations, the controller is configured to enter the rock cycling mode when the shift counter and the clutch temperature exceed respective thresholds.

In some implementations, the set of operating parameters further comprises (i) a position of an accelerator pedal of the vehicle, (ii) a speed of the vehicle, and (iii) a speed of an output shaft of the transmission. In some implementations, the controller is configured to enter the rock cycling mode when at least one of the accelerator pedal position, the vehicle speed, and the transmission output shaft speed exceeds respective thresholds. In some implementations, the controller is configured to exit the rock cycling mode when the shift counter returns to zero and the clutch temperature falls below the respective threshold including an applied hysteresis.

In some implementations, the controller is configured to exit the rock cycling mode when the shift counter returns to zero, the clutch temperature falls below the respective threshold including an applied hysteresis, and at least one of the accelerator pedal position, the vehicle speed, and the transmission output shaft speed falls below their respective thresholds including applied hysteresis. In some implementations, the set of operating parameters further includes a driver-controllable enable/disable signal for rock cycling detection. In some implementations, the vehicle is a heavy duty pickup truck.

According to another example aspect of the invention, a method for controlling an automatic transmission of a vehicle is presented. In one exemplary implementation, the method comprises receiving, by a controller and from a set of sensors, a set of operating parameters of the vehicle, the set of operating parameters each relating to a rock cycling maneuver of the vehicle, the rock cycling maneuver comprising a plurality of consecutive garage shifts of the transmission, determining, by the controller, whether the set of operating parameters satisfy a set of entry or exit criteria to/from a rock cycling mode of the transmission and enter/exit the rock cycling mode based on the determination, while not in the rock cycling mode, controlling, by the controller, the transmission based on a first set of calibrations for the transmission, the first set of calibrations being optimized for normal garage shifts of the transmission, and while in the rock cycling mode, controlling, by the controller, the transmission based on a different second set of calibrations for the transmission, the second set of calibrations being optimized for the rock cycling maneuver.

In some implementations, the method further comprises applying, by the controller, hysteresis to the determination of whether the set of operating parameters satisfy the set of exit criteria from the rock cycling mode of the transmission. In some implementations, the set of operating parameters includes (i) a shift counter of successive D-R or R-D transitions of the transmission and (ii) a temperature of a clutch of the transmission. In some implementations, the method further comprises entering, by the controller, the rock cycling mode when the shift counter and the clutch temperature exceed respective thresholds.

In some implementations, the set of operating parameters further comprises (i) a position of an accelerator pedal of the vehicle, (ii) a speed of the vehicle, and (iii) a speed of an output shaft of the transmission. In some implementations, the method further comprises entering, by the controller, the rock cycling mode when at least one of the accelerator pedal position, the vehicle speed, and the transmission output shaft speed exceeds respective thresholds. In some implementations, the method further comprises exiting, by the controller, the rock cycling mode when the shift counter returns to zero and the clutch temperature falls below the respective threshold including an applied hysteresis.

In some implementations, the method further comprises exiting, by the controller, the rock cycling mode when the shift counter returns to zero, the clutch temperature falls below the respective threshold including an applied hysteresis, and at least one of the accelerator pedal position, the vehicle speed, and the transmission output shaft speed falls below their respective thresholds including applied hysteresis. In some implementations, the set of operating parameters further includes a driver-controllable enable/disable signal for rock cycling detection. In some implementations, the vehicle is a heavy duty pickup truck.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
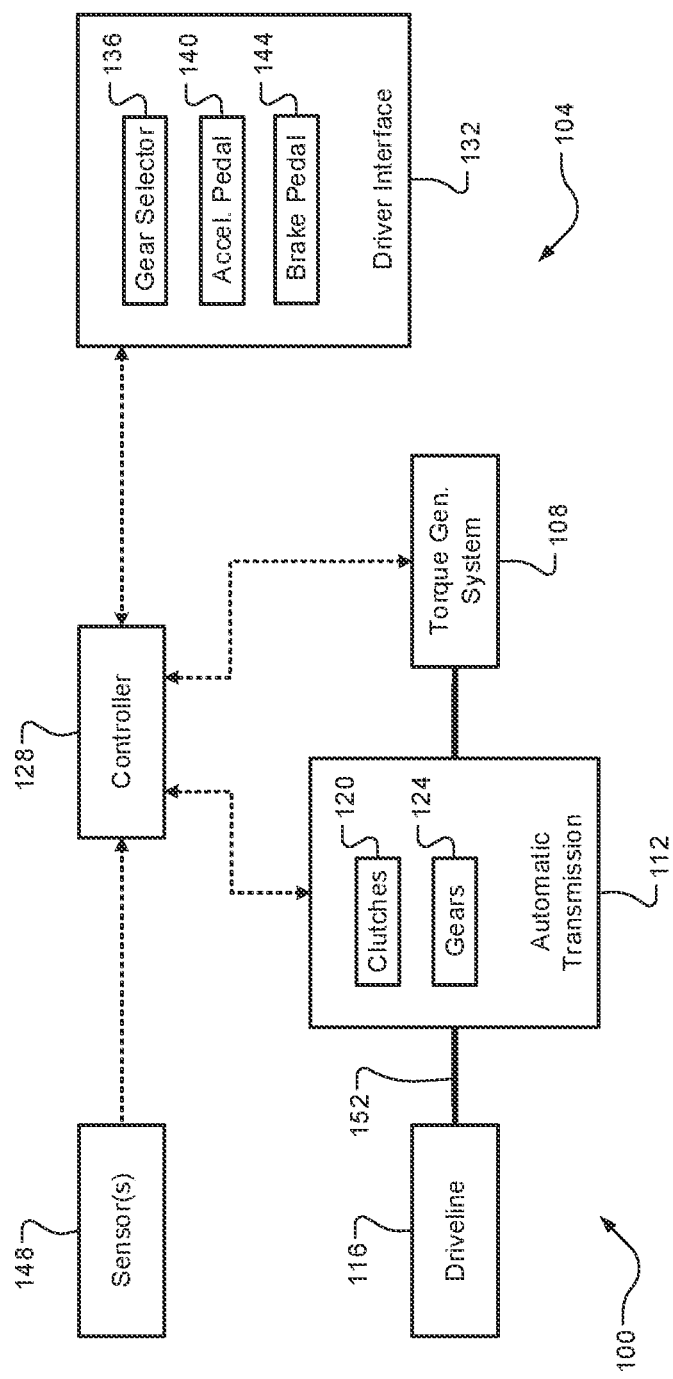
FIG. 1 is a functional block diagram of a vehicle having an automatic transmission control system according to the principles of the present application.

As previously discussed, when an accelerator pedal is being applied during multiple consecutive garage shifts (e.g., rock cycling) of an automatic transmission of a vehicle, there is little time for the transmission's clutches to cool down thus resulting in rising clutch temperatures that could cause a fault or malfunction of the transmission. Because rock cycling is a very aggressive maneuver, clutch life and durability should be prioritized over shift feel and driver comfort, as the driver would or should expect. One potential solution to this problem includes reduction of powertrain (e.g., engine) torque to allow the clutch temperatures to decrease, but this torque limiting requires additional controls and has a significant negative impact on customer performance. Another potential solution to this problem includes shortening the garage shifts to limit energy, but this could result in decreased or compromised shift quality for a majority of customer-performed garage shifts. As both of these solutions have their drawbacks, there exists an opportunity for improvement in the relevant art.

Accordingly, improved automatic transmission control systems and methods are presented herein. These improved control systems and methods specifically involve the clutch control logic in an automatic transmission to affect the transmission pressure during a garage shift. The logic includes controls to detect repeated garage shift maneuvers based various entry or entrance criteria. This entry criteria allows for a separate set of calibration handles to thereafter be used to close the clutches faster and reduce the energy during the shift while maintaining standard garage shift quality. This solution also involves detecting a specific set of maneuvers—reverse (R) to drive (D), or R-D, and D-R—based on a set of input criteria (temperature, pedal, number of repetitions, etc.) that would indicate that the driver may be in position where rocking the vehicle is necessary. Once these maneuvers are detected, the software will switch to the separate set of calibration labels specifically used to ensure that the shift energy is controlled to a satisfactory level during the rock cycling, while keeping the normal calibrated garage shifts untouched.

This solution is different than the previous conventional solutions as it will allow detection of repeated maneuvers and will allow the use of a separate set of calibration labels to reduce and control shift energy during rock cycling (repeated garage shifts). Traditionally, transmission calibration changes for these repeated vehicle rocking maneuvers would compromise the shift quality for all other garage shifts globally. This solution prevents compromises in garage shift quality being made to cover durability concerns for a specific set of maneuvers that are not covered under normal customer usage. In other words, conventional calibration to cover these "worst-case" scenarios such as rock cycling, even though they are considered extreme scenarios and not often encountered, would result in decreased shift quality/performance for other non-extreme (normal) garage shift operating scenarios that are more often or mostly encountered. This decreased normal garage shift quality/performance could be noticeable to a driver of the vehicle, which is undesirable. On the other hand, the ability to perform rock cycling on certain types of vehicles (e.g., sport utility vehicles (SUVs) or heavy duty trucks) is also desirable to the driver.

Referring now to FIG. 1, a functional block diagram of a vehicle 100 having an example automatic transmission control system 104 according to the principles of the present application is illustrated. It will be appreciated that this is merely one example configuration of the vehicle 100 and that the techniques of the present application could be applicable to any suitable vehicle having an automatic transmission. In one exemplary implementation, the vehicle 100 is a heavy duty pickup truck capable of carrying and/or towing a large payload. The vehicle 100 generally comprises a torque generating system 108 (an engine, an electric motor, or combinations thereof) configured to generate and transfer drive torque via a multi-speed automatic transmission 112 to a driveline 116 of the vehicle 100 for propulsion. The automatic transmission 112 comprises a plurality of clutches 120 configured to selectively engage one of a plurality of gears 124 (e.g., park/reverse/neutral/drive, PRND, or PRND plus drive-low, PRNDL). The torque generating system 108 and the automatic transmission 112 could be collectively referred to as a powertrain of the vehicle 100.

A controller 128 controls operation of the vehicle 100, including controlling the torque generating system 108 to generate a desired amount of drive torque to meet a driver torque request received via a driver interface 132 (e.g., an accelerator pedal 136). Other input devices of the driver interface 132 include a gear selector 140 (e.g., PRND or PRNDL) for the automatic transmission 112 and a brake pedal 144. The vehicle 100 also comprises a set of sensors 148 configured to measure various parameters, such as, but not limited to, clutch temperature(s), speed of an output shaft 152 of the automatic transmission 112, a speed of the vehicle 100 (e.g., a speed of the driveline 116), and position (s) of the accelerator/brake pedals 136, 144. The controller 128 is also configured to perform at least a portion of the techniques of the present application, which are described in greater detail below with reference to FIGS. 2 and 3.

These techniques include determining whether standard garage shift calibrations for control of the automatic transmission 112 should be utilized, or if different calibrations for rock cycling of the automatic transmission 112 should be temporarily utilized (e.g., based on specific entry and exit conditions). Rock cycling represents an extreme corner case and thus conventional automatic transmission control systems/methods do not have calibration labels to specifically address this condition. This often results in sacrificed calibration in order to also cover these extreme corner cases. During initial rock cycle testing, the throttle/accelerator is held at wide-open throttle (WOT) and the gear selector 140 is rapidly changed from R-D, D-R, and back-and-forth. As previously mentioned, there are currently no independent calibration labels to specifically address this condition, which results in sacrificed calibration to cover extreme corner cases. This improved rock cycle testing of the present application Introduces several new calibration labels to specifically target rock cycle conditions (rock cycle detection and entry/exit to a specific rock cycling mode).

Examples of the criteria include, but are not limited to, (i) shift counter (how many R-D/D-R maneuvers are done successively), (ii) clutch temperature threshold (e.g., with hysteresis to prevent inadvertent exit/toggle), (iii) transmission output shaft speed threshold (e.g., with hysteresis to prevent inadvertent exit/toggle, (iv) vehicle speed threshold (e.g., with hysteresis to prevent inadvertent exit/toggle, and (v) pedal threshold (e.g., with hysteresis to prevent inadvertent exit/toggle). This hysteresis is discussed in greater detail below with respect to FIGS. 2-3. The resulting calibrations represent pressure surfaces (an offset to ratio change pressure) to use once in a detected rock cycle. These surfaces also limit torque during detected rock cycle. In one embodiment, these surfaces are utilized in a closed-loop manner, thereby allowing for the clutches could be aggressively closed thus prioritizing clutch transmission durability.

Figure 2:
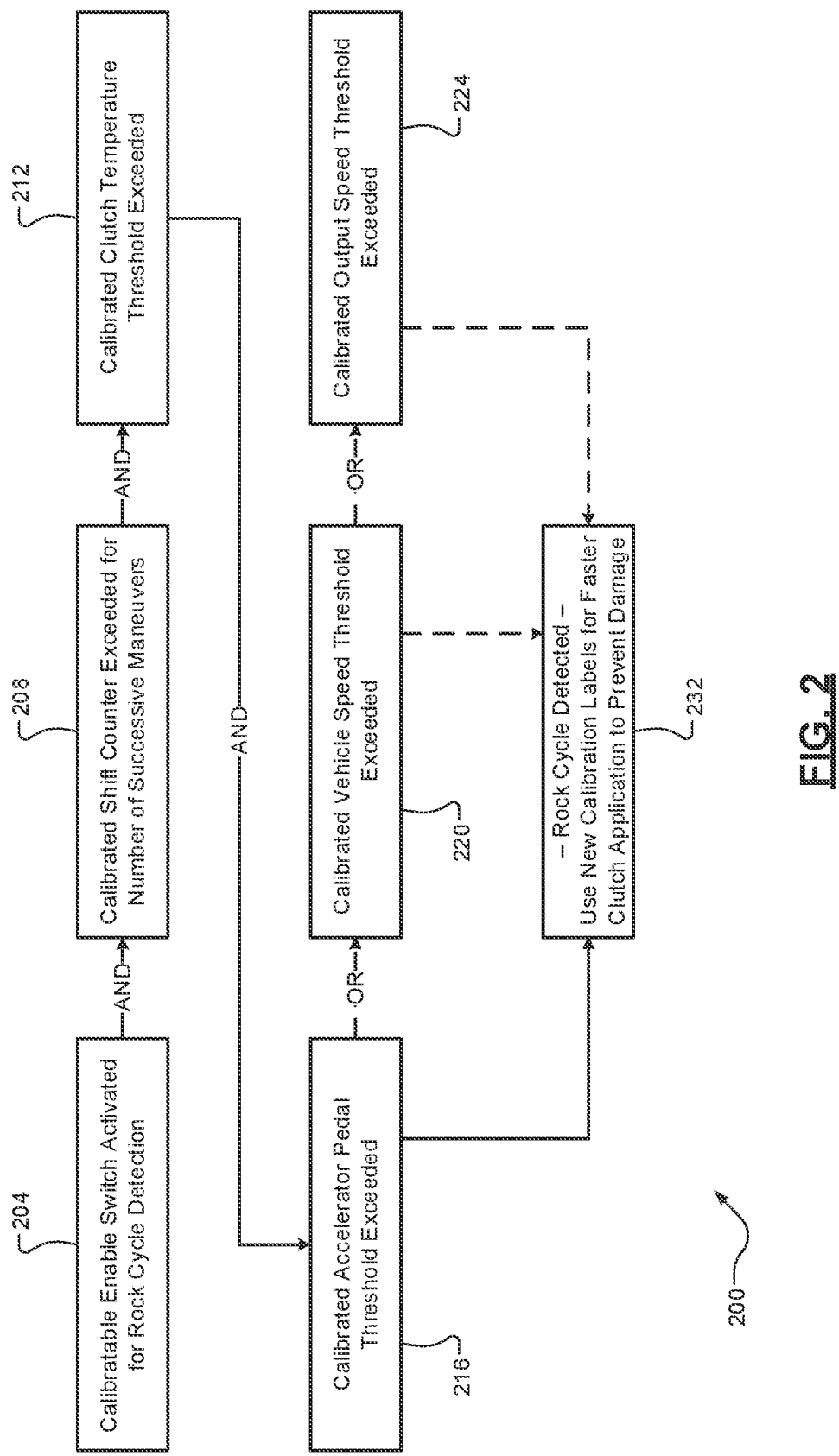
FIG. 2 is a flow diagram of an example entry method for rock cycling automatic transmission control according to the principles of the present application.
Figure 3:
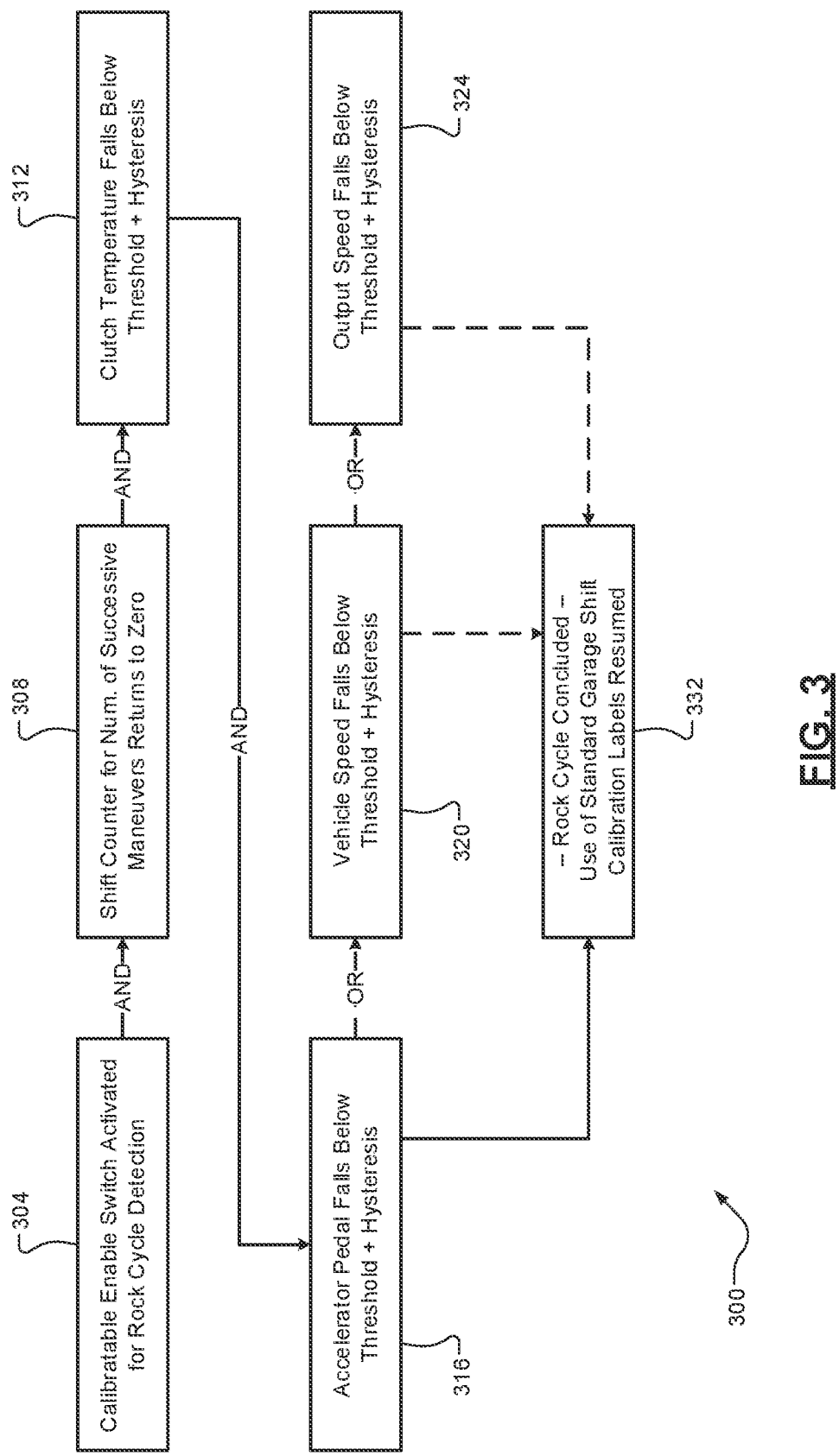
FIG. 3 is a flow diagram of an example exit method for rock cycling automatic transmission control according to the principles of the present application.

Referring now to FIGS. 2-3, a flow diagram of an example entry and exit methods 200, 300 for rock cycling automatic transmission control according to the principles of the present application is illustrated. In the entry method 200, at 204, 208, and 212, the controller 128 determines (i) whether the calibratable enable switch for rock cycle detection is activated, (ii) whether the current number of successive maneuvers (D-R and R-D) exceeds the calibrated shift counter, and (iii) whether the clutch temperature(s) exceed the calibrated clutch temperature threshold. When all three of these are true, the method 200 proceeds. At 216, 220, and 224, the controller 128 then determines whether (i) the accelerator pedal threshold exceeds the calibrated accelerator pedal threshold, (ii) the vehicle speed exceeds the calibrated vehicle speed threshold, and (iii) the transmission output speed threshold exceeds the calibrated output speed threshold. When one of these three determinations is true, the method 200 proceeds to 232 where the controller 128 determines that rock cycling has been detected and the controller 128 transitions to (e.g., a rock cycling mode) using the new calibration labels for faster clutch application in an attempt to prevent clutch/transmission damage or malfunction.

FIG. 3 is similar to FIG. 2 but illustrates an exit method 300, i.e., after the controller 128 has detected rock cycling at 232. In the exit method 300, at 304, 308, and 312, the controller 128 determines (i) whether the calibratable enable switch for rock cycle detection is activated, (ii) whether the current number of successive maneuvers (D-R and R-D) has returned to zero (or some suitable low threshold), and (iii) whether the clutch temperature(s) falls below the calibrated clutch temperature threshold, taking into account a corresponding hysteresis. When all three of these are true, the method 300 proceeds. At 316, 320, and 324, the controller 128 then determines whether (i) the accelerator pedal threshold falls below the calibrated accelerator pedal threshold, taking into account a corresponding hysteresis, (ii) the vehicle speed falls below the calibrated vehicle speed threshold, taking into account a corresponding hysteresis, and (iii) the transmission output speed threshold falls below the calibrated output speed threshold, taking into account a corresponding hysteresis. These hysteresis values are applied at 312, 316, 320, and 324 to prevent inadvertent or unnecessary exit and re-entry, which could be undesirable or otherwise noticeable to the driver. When one of these three determinations is true, the method 300 proceeds to 332 where the controller 128 determines that the current rock cycling has concluded and the controller 128 transitions to from using the new calibration labels back to using the standard garage shift calibration labels, i.e., until another rock cycling event is determined.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an automatic transmission of a vehicle, the control system comprising:

a set of sensors configured to monitor a set of operating parameters of the vehicle, the set of operating parameters each relating to a rock cycling maneuver of the vehicle, the rock cycling maneuver comprising a plurality of consecutive garage shifts of the transmission; and a controller configured to:

determine whether the set of operating parameters satisfy a set of entry or exit criteria to/from a rock cycling mode of the transmission and enter/exit the rock cycling mode based on the determination;

while not in the rock cycling mode, control the transmission based on a first set of calibrations for the transmission, the first set of calibrations being optimized for normal garage shifts of the transmission; and while in the rock cycling mode, control the transmission based on a different second set of calibrations for the transmission, the second set of calibrations being optimized for the rock cycling maneuver.

2. The control system of claim 1, wherein the controller is configured to apply hysteresis to the determination of whether the set of operating parameters satisfy the set of exit criteria from the rock cycling mode of the transmission.

3. The control system of claim 1, wherein the set of operating parameters includes (i) a shift counter of successive drive-to-reverse (D-R) or reverse-to-drive (R-D) transitions of the transmission and (ii) a temperature of a clutch of the transmission.

4. The control system of claim 3, wherein the controller is configured to enter the rock cycling mode when the shift counter and the clutch temperature exceed respective thresholds.

5. The control system of claim 4, wherein the set of operating parameters further comprises (i) a position of an accelerator pedal of the vehicle, (ii) a speed of the vehicle, and (iii) a speed of an output shaft of the transmission.

6. The control system of claim 5, wherein the controller is configured to enter the rock cycling mode when at least one of the accelerator pedal position, the vehicle speed, and the transmission output shaft speed exceeds respective thresholds.

7. The control system of claim 6, wherein the controller is configured to exit the rock cycling mode when the shift counter returns to zero, the clutch temperature falls below the respective threshold including an applied hysteresis, and at least one of the accelerator pedal position, the vehicle speed, and the transmission output shaft speed falls below their respective thresholds including applied hysteresis.

8. The control system of claim 4, wherein the controller is configured to exit the rock cycling mode when the shift counter returns to zero and the clutch temperature falls below the respective threshold including an applied hysteresis.

9. The control system of claim 1, wherein the set of operating parameters further includes a driver-controllable enable/disable signal for rock cycling detection.

10. The control system of claim 1, wherein the vehicle is a heavy duty pickup truck.

11. A method for controlling an automatic transmission of a vehicle, the method comprising:

receiving, by a controller and from a set of sensors, a set of operating parameters of the vehicle, the set of operating parameters each relating to a rock cycling maneuver of the vehicle, the rock cycling maneuver comprising a plurality of consecutive garage shifts of the transmission;

determining, by the controller, whether the set of operating parameters satisfy a set of entry or exit criteria to/from a rock cycling mode of the transmission and enter/exit the rock cycling mode based on the determination;

while not in the rock cycling mode, controlling, by the controller, the transmission based on a first set of calibrations for the transmission, the first set of calibrations being optimized for normal garage shifts of the transmission; and while in the rock cycling mode, controlling, by the controller, the transmission based on a different second set of calibrations for the transmission, the second set of calibrations being optimized for the rock cycling maneuver.

12. The method of claim 11, further comprising applying, by the controller, hysteresis to the determination of whether the set of operating parameters satisfy the set of exit criteria from the rock cycling mode of the transmission.

13. The method of claim 11, wherein the set of operating parameters includes (i) a shift counter of successive drive-to-reverse (D-R) or reverse-to-drive (R-D) transitions of the transmission and (ii) a temperature of a clutch of the transmission.

14. The method of claim 13, further comprising entering, by the controller, the rock cycling mode when the shift counter and the clutch temperature exceed respective thresholds.

15. The method of claim 14, wherein the set of operating parameters further comprises (i) a position of an accelerator pedal of the vehicle, (ii) a speed of the vehicle, and (iii) a speed of an output shaft of the transmission.

16. The method of claim 15, further comprising entering, by the controller, the rock cycling mode when at least one of the accelerator pedal position, the vehicle speed, and the transmission output shaft speed exceeds respective thresholds.

17. The method of claim 16, further comprising exiting, by the controller, the rock cycling mode when the shift counter returns to zero, the clutch temperature falls below the respective threshold including an applied hysteresis, and at least one of the accelerator pedal position, the vehicle speed, and the transmission output shaft speed falls below their respective thresholds including applied hysteresis.

18. The method of claim 14, further comprising exiting, by the controller, the rock cycling mode when the shift counter returns to zero and the clutch temperature falls below the respective threshold including an applied hysteresis.

19. The method of claim 11, wherein the set of operating parameters further includes a driver-controllable enable/disable signal for rock cycling detection.

20. The method of claim 11, wherein the vehicle is a heavy duty pickup truck.

* * * * *